UNITED STATES PATENT OFFICE.

FLOYD A. ALBERTUS, OF MILWAUKEE, WISCONSIN, ASSIGNOR OF ONE-FOURTH TO CLAYTON S. FLINT, OF MILWAUKEE, WISCONSIN.

SOLDERING COMPOSITION FOR ALUMINUM.

1,416,924. Specification of Letters Patent. Patented May 23, 1922.

No Drawing. Application filed December 3, 1919. Serial No. 342,264.

*To all whom it may concern:*

Be it known that I, FLOYD A. ALBERTUS, a citizen of the United States, residing at Milwaukee, in the county of Milwaukee and State of Wisconsin, have invented certain new and useful Improvements in Soldering Compositions for Aluminum, of which the following is a specification.

This invention relates to soldering compositions, and particularly an alloy or composition for soldering or joining aluminum.

The object of the invention is to provide an alloy which may be used in soldering or joining aluminum, which will have the same color as aluminum, and which will join the aluminum as perfectly and strongly as if the joint was formed by acetylene welding.

The composition consists of the following ingredients:—

|  | Per cent. |
|---|---|
| Tin | 58.45 |
| Zinc | 35 |
| Aluminum | 4.19 |
| Antimony | 1.22 |
| Phosphor tin | 1.14 |

In forming this composition, I first melt the aluminum and then add thereto tin in small quantities, stirring the mixture well. This tin is preferably "block tin," that is second grade tin. I next add thereto the zinc in small quantities and mix well and then add the antimony in small quantities. To this mixture is then added phosphor tin and coincidently with the addition of the phosphor tin I remove the mixture from the fire and throw into the mixture either aluminum flux, which is zinc chloride or rosin or a mixture of borax and ammonia chloride. The aluminum flux when added to the mixture causes the dirt and impurities in the metal to rise to the top so that they may be skimmed off.

Where phosphor tin is used as part of the alloy, the solder will stick as long as the aluminum retains its original state. The reason for removing the material from the fire immediately after adding the phosphor tin is to keep the phosphor tin from burning, as phosphor tin will burn if much heat is applied to it. At the time when the zinc is put into the composition there should only be enough heat to cause the zinc to melt.

The aluminum is used to give color to the composition, that is to make the composition whiter and also tougher. By mixing aluminum and zinc and applying the alloy to the aluminum to be soldered it retards oxidization (the skin or oxide on the aluminum having been first removed with a scraper or file before the solder is applied). The oxide will not form in between the solder and the aluminum article inasmuch as the oxide is so much greater in solder that it will dissolve the oxide which forms on the aluminum. Again the zinc hardens the alloy. The block tin acts as a base. Phosphor tin is a composition found upon the market of the following ingredients approximately in the proportions stated, namely tin 5%, antimony 10%, zinc 35%, aluminum 5%, graphite 5%, and phosphorus 40%. The phosphor tin cleans and is also particularly adhesive; that is it causes the solder to stick tighter than it otherwise would do. Furthermore, as before remarked, by adding phosphor tin to the alloy, the phosphorus is retained and is not burned up immediately, as would be the case were pure phosphorus used. I have found in actual practice that a chemical action takes place when phosphor tin is used which I am unable to explain.

In the manufacture of this solder the percentage of block tin may be slightly increased or decreased. Any increase in percentage of aluminum will raise the melting point of the solder and the aluminum that is being soldered will have to be brought to a correspondingly high heat before the solder can be applied. If too much antimony be added to the composition it will cause the solder to be brittle. Were the antimony left out, then when there is a strain on the piece of aluminum that is being repaired with solder that has no antimony in it and the aluminum should expand while cooling, it would cause the parts being repaired to crack. By using antimony, however, in the solder, if the parts being repaired expand, there is not much possibility of the parts cracking, for with antimony in the solder there is considerable expansion and contraction.

No flux is used in applying this solder. This soldering composition is to be used in soldering blow-holes, cracks and broken parts in cast and plate aluminum. In use, the parts to be soldered or connected are thoroughly cleaned with file and scraper.

Then the parts to be repaired are heated to such a degree that the composition before described will melt by rubbing on without applying any heat directly to the composition. After applying a small amount of the composition to the metal, the metal is rubbed well with an iron paddle or with a wire brush until the surface is well coated. This is particularly important, as every piece of aluminum is covered with a film of oxide which has to be rubbed off, and the aluminum soldering composition applied at the same time. The aluminum composition is applied in sufficient quantities to fill up holes or cracks and is then smoothed off with an iron paddle.

The parts to be repaired may be welded by means of a blow torch and the joint made by this aluminum composition is stronger than the aluminum itself. By this means, aluminum may be readily soldered or joined, and inasmuch as the solder is the same color as the aluminum, the joint is not apparent.

I claim:—

1. As a solder for aluminum, an alloy of aluminum, tin, zinc, antimony and phosphor tin.

2. A soldering composition consisting of the following ingredients having approximately the proportions stated:

|  | Per cent. |
|---|---|
| Tin | 58.45 |
| Zinc | 35 |
| Aluminum | 4.19 |
| Antimony | 1.22 |
| Phosphor tin | 1.14 |

3. As a solder for aluminum, an alloy of a relatively large proportion of tin, a relatively large proportion of zinc, a relatively small proportion of aluminum, and relatively small proportions of antimony and phosphorus, the proportions of antimony and phosphorus being less than the proportion of aluminum.

4. As a solder for aluminum, an alloy of a relatively large proportion of tin, a relatively large proportion of zinc, a relatively small proportion of aluminum, and relatively small proportions of antimony and phosphor tin, the proportions of antimony and phosphor tin being less than the proportion of aluminum.

In testimony whereof I hereunto affix my signature.

FLOYD A. ALBERTUS.